J. A. CUMMINS.
VARIABLE FEED FOR AX HANDLE LATHES.
APPLICATION FILED JULY 8, 1907.

910,507.  Patented Jan. 26, 1909.

WITNESSES:
John E. Heller.
Minnie C. Rollwage

INVENTOR
James A. Cummins
BY
Abraham Knobel
ATTORNEY

UNITED STATES PATENT OFFICE.

JAMES ASHER CUMMINS, OF LOUISVILLE, KENTUCKY, ASSIGNOR TO TURNER DAY & WOOLWORTH HANDLE CO., INC., OF LOUISVILLE, KENTUCKY.

VARIABLE FEED FOR AX-HANDLE LATHES.

No. 910,507.    Specification of Letters Patent.    Patented Jan. 26, 1909.

Application filed July 8, 1907. Serial No. 382,784.

*To all whom it may concern:*

Be it known that I, JAMES ASHER CUMMINS, a citizen of the United States, residing at Louisville, in the county of Jefferson and State of Kentucky, have invented a new and useful Variable Feed for Ax-Handle Lathes, of which the following is a specification.

This invention relates to feeding devices for ax handle lathes, and the objects of my invention are to provide a feeding device for ax handle lathes by means of which the ratio of feed to speed of the pattern may be changed at the will of the operator, and thus render a single lathe capable of producing all sizes of handles at the most advantageous cutting feeds and speeds. These objects I attain by means of the mechanism illustrated in the accompanying drawing in which—

Figure 1:
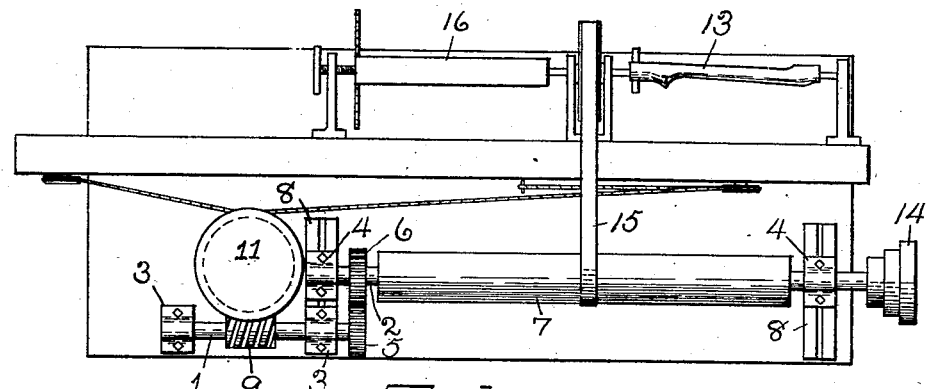
Figure 2:
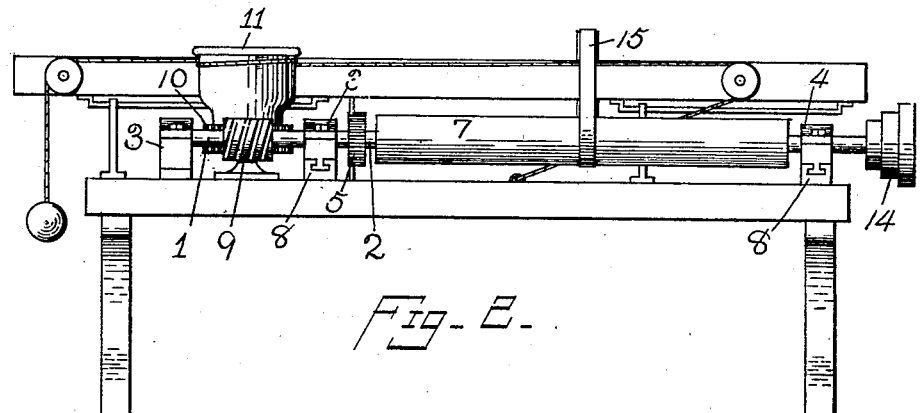
Figure 3:
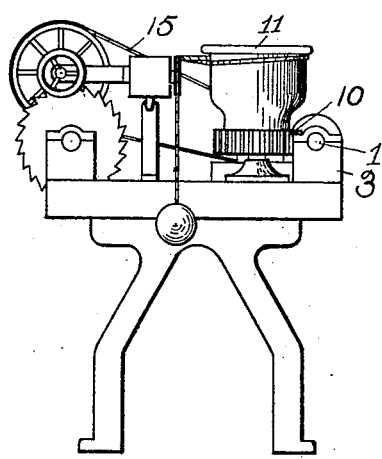

Figure 1 is a top plan view of an ax handle lathe equipped with my variable feed; Fig. 2 is a rear elevation; Fig. 3 is an end elevation.

In ax handle lathes of the conventional type, the worm-shaft 1, and the drum-shaft 2 are not made separately, but in one continuous length of shafting, which serves both as a worm-shaft and drum-shaft. It will be observed that in such a construction the ratio between the longitudinal feed and the rotary speed of pattern 13 cannot be changed. If the speed of the machine be increased, both the rotary speed of the pattern and the longitudinal feed operated by the worm 9 are increased in the same proportion. Now as ax handles vary greatly both in size and shape, it is in many cases desirable to change the ratio between the rotary speed of pattern 13 and the longitudinal feed. This I accomplish as follows:—The worm-shaft 1 and the drum-shaft 2 are mounted parallel to each other. The worm-shaft 1 has mounted upon it near bearing 3, a spur gear 5. Drum-shaft 2 has mounted upon it near bearing 4, the spur gear 6, meshing with gear 5. Drum-shaft bearings 4 are mounted slidably upon brackets 8. When the lathe is in use, the drum 7, being belt-driven through the step cone 14 and drum-shaft, actuates the longitudinal feed by the means of gears 5 and 6, and also the rotary feed by means of belt 15. The rotary feed for rotating the pattern 13 and the stock 16 as shown is of the conventional type. Assuming that gears 5 and 6 are equal, one revolution of drum 7 produces one revolution of worm 9. But the gears 5 and 6 are so fastened upon their respective shafts that they may be readily removed and changed at the will of the operator. Gears of any size within the compass of the lathe may be used, as slidable bearings 4 permit the distance between the centers of the gears to be increased or diminished.

Having thus described my invention so that any one skilled in the art pertaining thereto may make and use it, I claim—

1. In a lathe for turning ax handles, a pattern holder, a worm shaft, means operated by said worm shaft for imparting longitudinal motion to said pattern, a drum shaft imparting rotary motion to said pattern, said drum being mounted in slidable bearings parallel to said worm shaft, the proximate ends of said shafts being operatively connected by spur gears.

2. In a lathe for turning ax handles, a stock and pattern holder, a worm shaft mounted in stationary bearings, means operated by said worm shaft for imparting longitudinal motion to said holder, a drum shaft, means operated by said drum shaft for imparting rotary motion to said holder, said drum shaft being mounted in slidable bearings parallel to said worm shaft, the proximate ends of said shafts being operatively connected by removable spur gears.

JAMES ASHER CUMMINS.

Witnesses:
J. WALTON MAXEY,
D. B. MEDANICH.